Jan. 5, 1960   R. J. HOPPER ET AL   2,919,869
REELING UNIT FOR USE ON AIRCRAFT
Filed March 30, 1956   6 Sheets-Sheet 1

INVENTORS
ROBERT J. HOPPER
BOYD B. ELDER
BY Smyth & Roston
ATTORNEYS

INVENTORS
ROBERT J. HOPPER
BOYD B. ELDER
BY
ATTORNEYS

Jan. 5, 1960  R. J. HOPPER ET AL  2,919,869
REELING UNIT FOR USE ON AIRCRAFT
Filed March 30, 1956  6 Sheets-Sheet 3
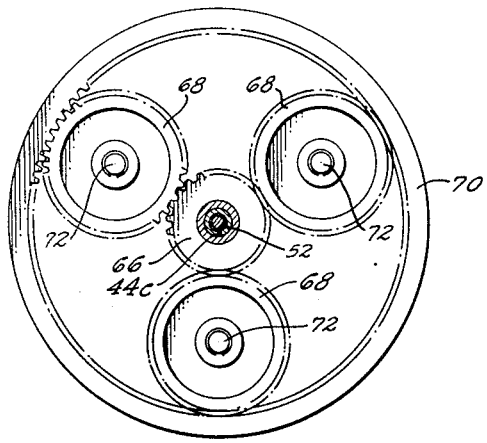
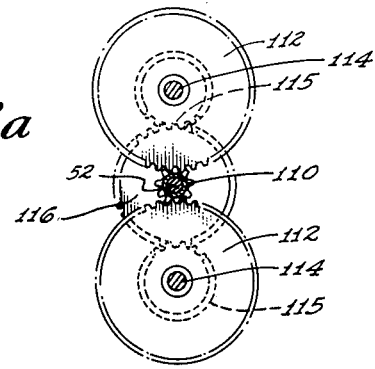
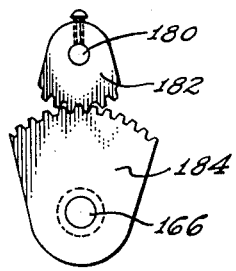
INVENTORS
Robert J. Hopper
Boyd B. Elder
By Smyth & Roston
Attorneys

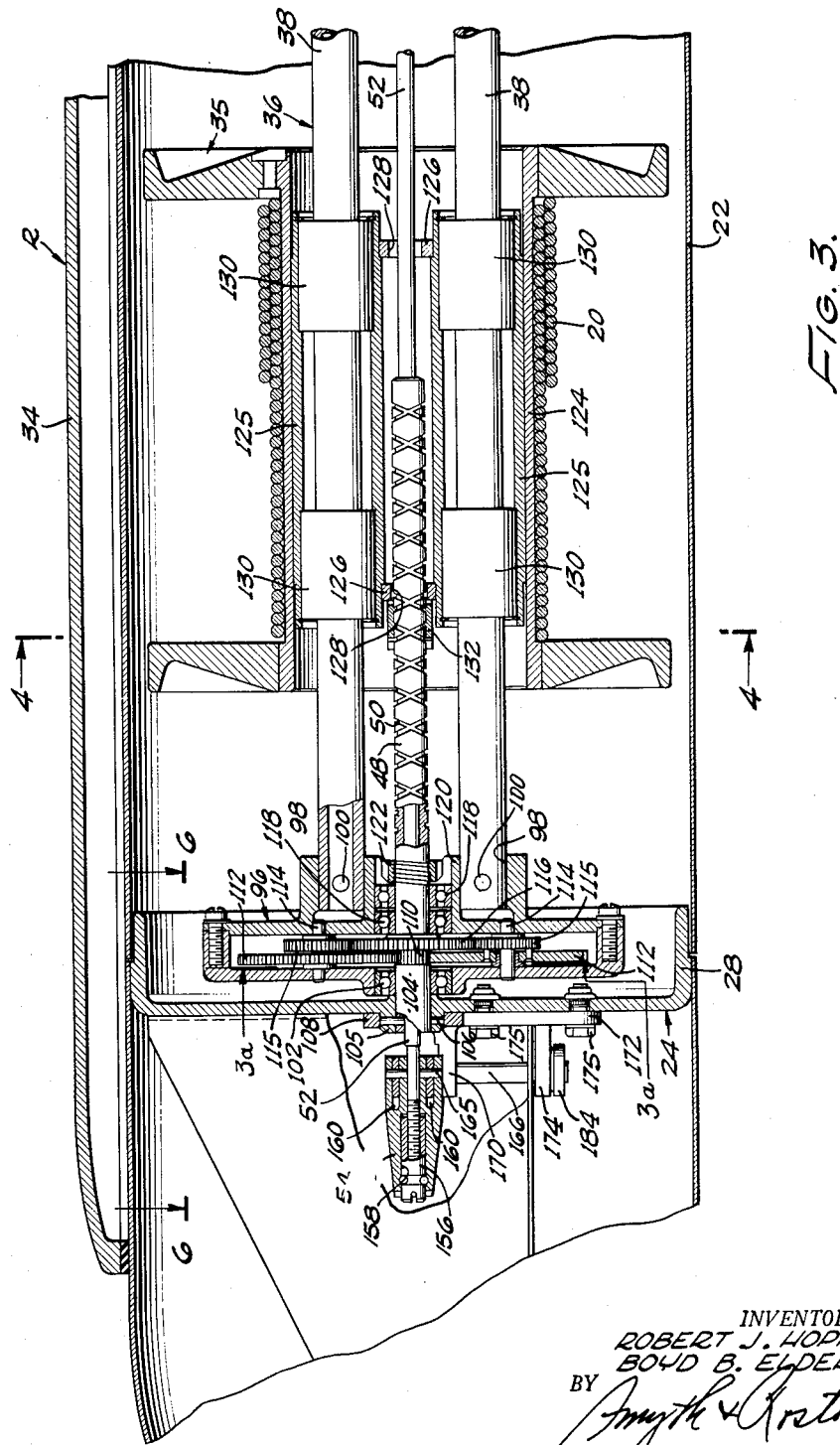

INVENTORS
ROBERT J. HOPPER
BOYD B. ELDER
BY
ATTORNEYS

Jan. 5, 1960  R. J. HOPPER ET AL  2,919,869
REELING UNIT FOR USE ON AIRCRAFT
Filed March 30, 1956  6 Sheets-Sheet 6
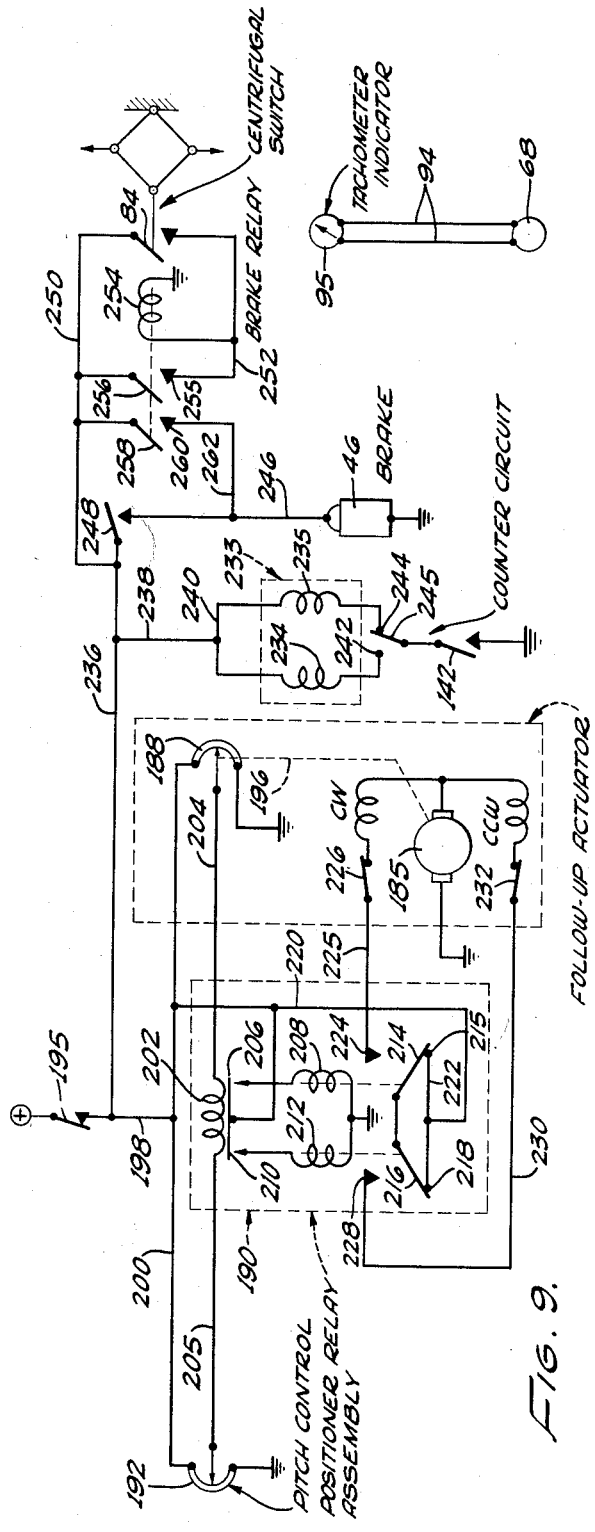
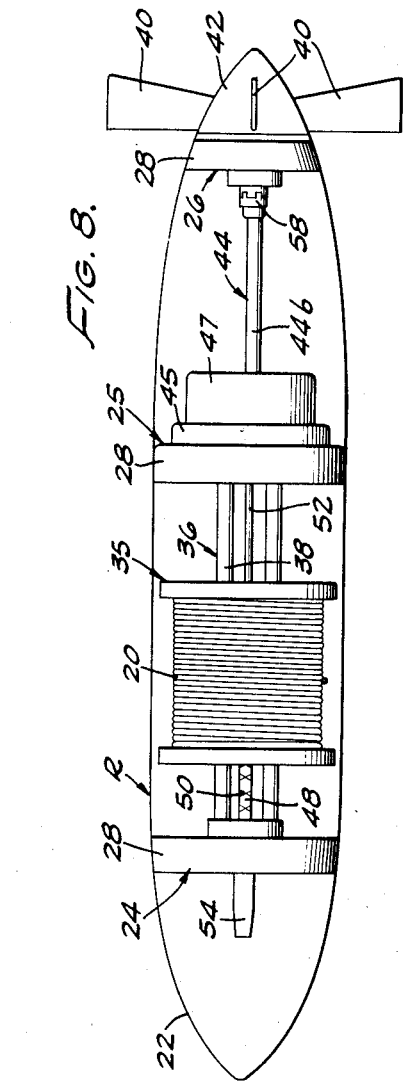
INVENTORS
ROBERT J. HOPPER
BOYD B. ELDER
BY
*Smyth & Roston*
ATTORNEYS.

United States Patent Office 2,919,869
Patented Jan. 5, 1960

2,919,869

REELING UNIT FOR USE ON AIRCRAFT

Robert J. Hopper, Pacific Palisades, and Boyd B. Elder, Los Angeles, Calif., assignors to Del Mar Engineering Laboratories, Los Angeles, Calif., a corporation Application March 30, 1956, Serial No. 575,015

5 Claims. (Cl. 244—3)

This invention relates to a cable-reeling apparatus for use on an aircraft for handling various objects such as tow targets and the like. While the invention in its different aspects has many potential uses, it has special utility in cooperation with a tow target launcher. In such a practice of the invention a tow target launcher is mounted on the underside of a wing of an aircraft to snub a tow target thereto and to launch the tow target in the course of flight. The preferred embodiment of the reeling apparatus of the present invention is a unit mounted on the underside of the aircraft at a location spaced laterally from the launcher and a tow cable connected to the nose of the tow target extends from the launcher to the reeling unit.

Preferably, the reeling unit comprises a reel in a streamlined pod or housing with the axis of rotation of the reel extending longitudinally of the housing. Suitable aerodynamic means such as a propeller incorporated in the unit derives power from the airstream for rotating the reel and also for actuating a level wind mechanism that reciprocates the reel along its axis. In the preferred practice of the invention, the aerodynamic power means is a variable pitch propeller which may be adjusted by remote control to vary the speed of rotation of the reel and also to change the direction of rotation of the reel.

One feature of the invention is the provision of an efficient reeling apparatus of this character that is both compact and relatively simple in construction. In this regard a novel aspect of the invention is the concept of providing a variable pitch propeller on the same axis as the reel and of providing operating means extending through the reel axially thereof to vary the pitch of the propeller. This arrangement makes possible a highly desirable distribution of the components of the reeling apparatus within the space limitations of a streamlined housing that tapers towards both of its ends. The propeller incorporating suitable pitch control mechanism is at one tapered end of the housing; the reel is in the central large-diameter portion of the housing; and a remote positioner or servo mechanism is at the other tapered end of the housing and is connected to the pitch control mechanism by the axially extending operating means.

Another feature of the invention is the concept of using a brake for the reel in combination with a remote positioning device for changing the pitch of the propeller. If the reel tends to rotate at too high speed, the brake is applied to retard or stop the reel and thus afford an opportunity for changing the pitch adjustment of the propeller. In the preferred practice of the invention, the procedure to be followed in the event of overspeed of the reel is to apply the brake to bring the reel to a complete stop, then to feather the propeller, and, finally, to increase the pitch of the propeller progressively until the desired speed of rotation of the reel is reached. This procedure adequately protects the apparatus from damage arising from excessive speed of the reel but does so without relying entirely on the remote positioner and thus makes it possible to use a remote positioner of simple construction. In this regard a feature of the preferred practice of the invention is the use of a centrifugal switch to apply the brake automatically whenever the reel reaches a predetermined maximum speed of rotation. A still further feature is the use of a self-locking brake to immobilize the reel, remotely controlled means being provided to unlock the brake as soon as the propeller blades are feathered. It is desirable, of course, to regulate the pitch of the propeller in such manner as to avoid frequent application of the brake. To this end, the preferred practice of the invention provides a speed indicator for guidance in the adjustment of the pitch of the propeller.

The various features and advantages of the invention may be understood from the following detailed description taken with the accompanying drawings.

In the drawings, which are to be regarded as merely illustrative:

Fig. 2a is a transverse section taken as indicated by the line 2a—2a of Figure 2 and shows a planetary gearing for actuating the reel;

Figure 3 is a similar view of the forward portion of the unit;

Figure 3a is a transverse section taken as indicated by the line 3a—3a of Figure 3 and shows the planetary gearing by means of which the reel actuates the level winding mechanism;

Figure 6 is a fragmentary sectional view taken as indicated by the line 6—6 of Figure 3 showing how a remote position actuator is operatively connected with the pitch control mechanism;

Figure 7 is a sectional view of the same structure taken as indicated by the angular line 7—7 of Figure 6;

Figure 7a is an end elevation of a pair of cooperating gear segments as viewed along the line 7a—7a of Figure 7.

Figure 8 is a simplified longitudinal view showing some of the major parts of the unit in side elevation; and Figure 9 is a wiring diagram showing how the electrical components of the units are related to each other.

*General arrangement*

Figure 1:
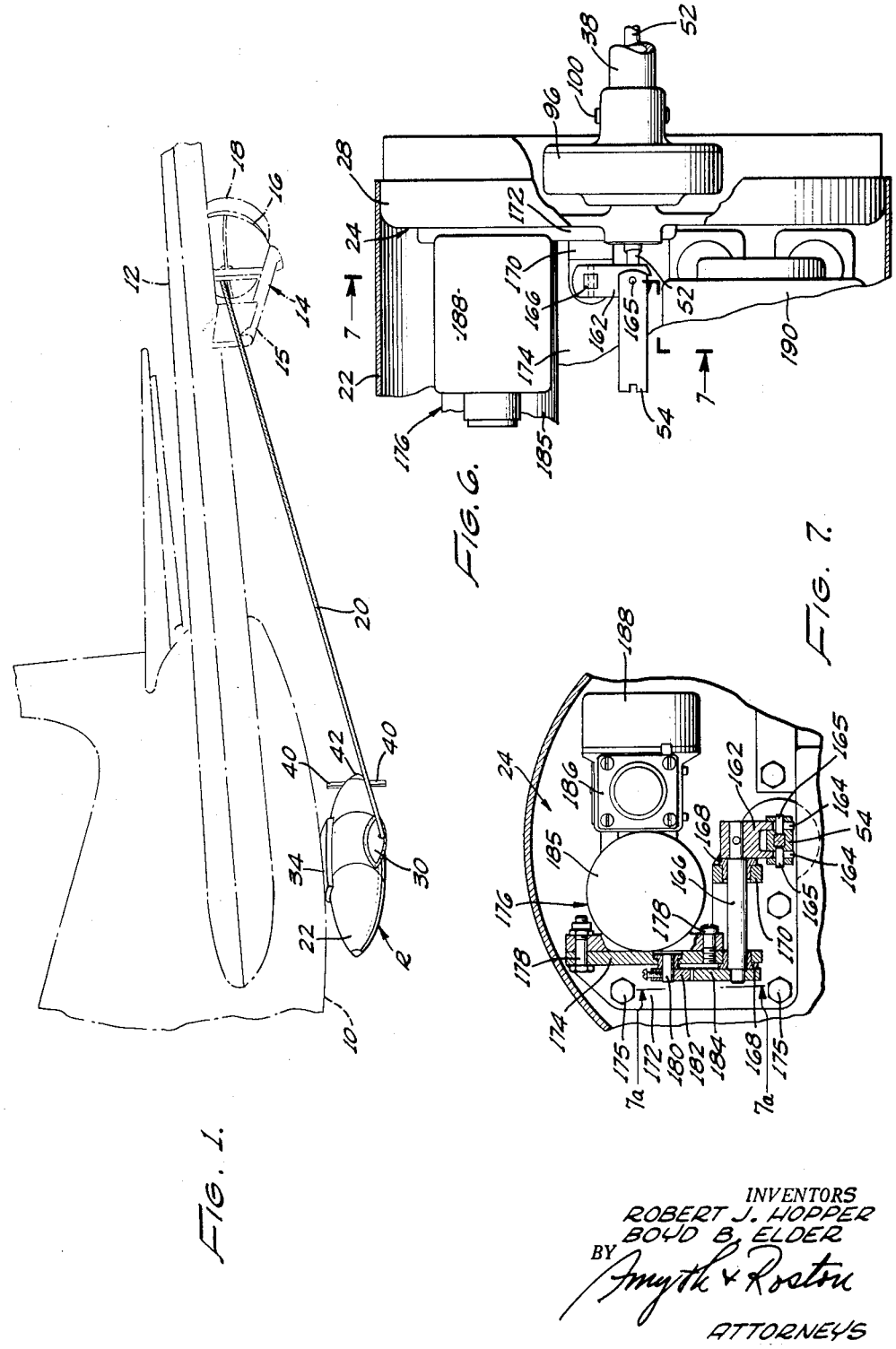
Figure 1 is a perspective view, partly in phantom, showing how the reel unit of the invention may be used on an aircraft in cooperation with a tow target launcher.

Figure 1 illustrating a selected practice of the invention shows in phantom the fuselage 10 of an airplane with a wing 12 extending laterally therefrom, and with a tow target launcher, generally designated 14, mounted on the underside of the wing. This tow target launcher may be constructed in accord with the teachings of the Hopper Patent 2,813,719 entitled Aircraft Tow Target Installation, which disclosure is hereby incorporated into the present disclosure by reference. The tow target launcher 14 includes what may be termed a pylon structure 15 having a rearwardly directed basket or cradle 16 made of tubular framework to nest the nose of a streamlined tow target 18.

The reel unit of the present invention, generally designated by the letter R, is shown in Figure 1 as mounted on the underside of the fuselage 10 with a tow cable 20 extending laterally from the unit to the tow target launcher 14.

Figure 2:
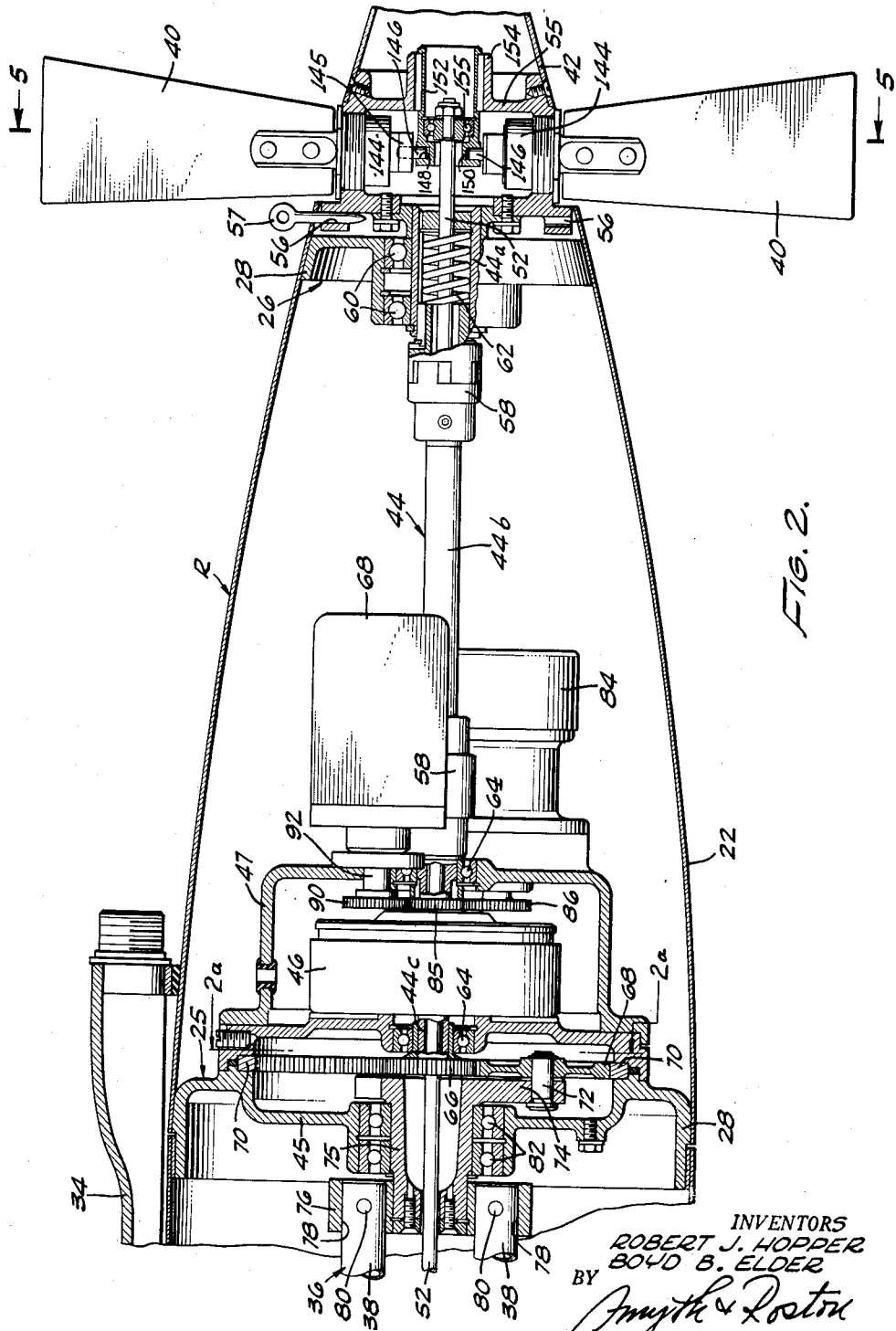
Figure 2 is a longitudinal sectional view of the aft portion of the unit.
Figure 4:
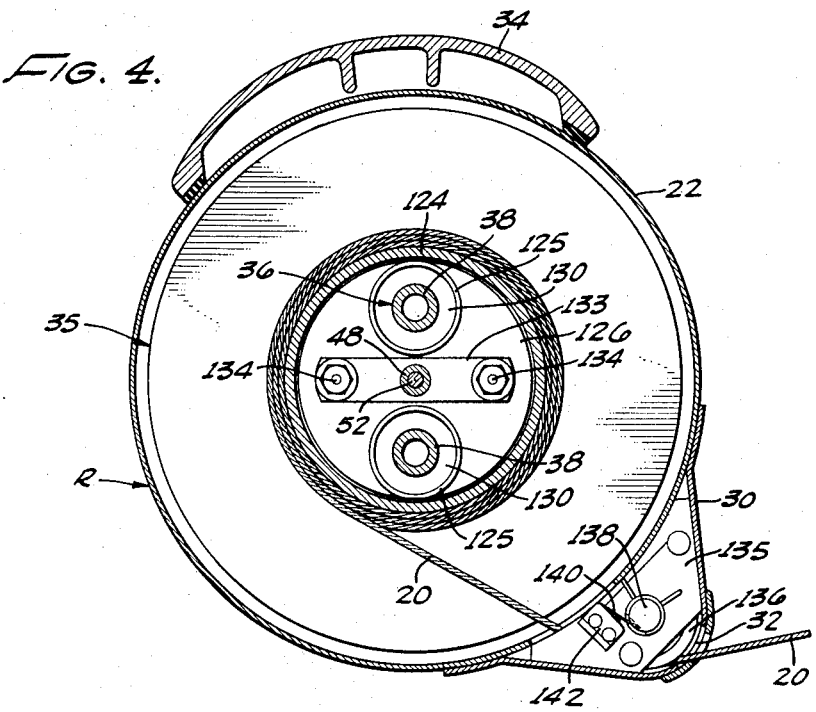
Figure 4 is a transverse section through the reel in the unit taken as indicated by the line 4—4 of Figure 3.

As shown in a simplified manner in Figure 8, the reel unit R has a streamlined housing 22 of circular cross-sectional configuration which is internally reinforced by a forward support structure 24, an intermediate support structure 25 and an aft support structure 26. As shown in Figures 2 and 3, each of these support structures has a peripheral skirt or flange 28 to which the wall of the housing 22 is suitably bonded to make an over-all unified structure. As shown in Figures 1 and 4, a cowling 30 is provided on the periphery of the housing 22 and the cable 20 passes through a slot 32 in this cowling.

The reel unit R may be mounted on the airplane fuselage 10 in any suitable manner. A feature of the present embodiment of the invention, however, is that it is interchangeable with a JATO (jet assist take-off) unit and may be quickly mounted on any aircraft that is equipped for JATO. For this purpose, the housing 22 of the reel unit R may be provided with what may be termed a mounting adapter plate 34 that is shown in section in Figures 2, 3 and 4, this adapter plate being removably bolted to the unit housing.

As shown in a simplified manner in Figure 8, the housing 22 contains a reel 35 that is slidingly mounted on a rotary reel frame, generally designated by the numeral 36. This reel frame 36 comprises essentially a pair of tubular rods 38 which extend longitudinally of the unit, the reel frame being suitably journalled at its opposite ends in the support structures 24 and 25 for rotation about the axis of the reel 35.

A propeller assembly including propeller blades 40 and a tapered spinner 42 is provided at the aft end of the housing to actuate the reel 35 by means of a longitudinal tubular drive shaft 44 that is operatively connected with the reel frame 36. In this instance, the tubular shaft 44 drives the reel frame 36 by means of differential gearing in a gear case 45 that is united with the intermediate support structure 25. Preferably the drive shaft 34 extends through an electrically actuated brake 46 (Figure 2) in a housing 47, the brake acting on the shaft to brake the reel 35 whenever desired.

The reel 35 is reciprocated axially on the reel frame 36 by what may be termed a level wind mechanism that includes a tubular level wind shaft or screw 48. The level wind shaft 48 is coaxial with the reel frame 36 and extends through both the reel frame 36 and the reel 35. This level wind shaft 48 is provided with a continuous helical thread or groove 50 for continual reciprocation of the reel on the frame 36. This level wind shaft 48 is actuated in response to rotation of the reel frame 36 by means of differential gears in the forward support structure 24.

The blades 40 of the propeller assembly are variable in pitch and the pitch control mechanism therein is actuated by an operating rod 52 that extends through the tubular drive shaft 44 and through the reel frame 36 as well as through the tubular level wind shaft 48. The operating rod 52 terminates in a forward fitting 54 which is operatively connected to a suitable remote control mechanism.

*Details of the reeling mechanism*

As shown in Figure 2, the propeller assembly for actuating the reel 35 includes a hub structure 55 on which the spinner 42 is mounted. Preferably, the hub structure 55 has a circumferential series of radial bores 56 which may be selectively registered with an aperture in the housing 22 so that a locking pin 57 may be inserted through the housing aperture into a selected radial bore, as shown in Figure 2, to immobilize the propeller assembly when power is not available to energize the brake 46.

The drive shaft 44 may be made in three sections 44a, 44b and 44c interconnected by a pair of couplings 58. The aft shaft section 44a which carries the propeller hub structure 55 is journalled by bearings 60 in the aft support structure 26 and houses a suitable spring 62 for exerting pressure against the adjacent coupling 58. The intermediate shaft section 44b extends between the two couplings 58. The forward shaft section 44c extends through the brake 46 and is journalled in suitable bearings 64 in the previously mentioned gear housing 47.

The shaft section 44c at the forward end of the drive shaft 44 has a gear 66 thereon inside the previously mentioned gear case 45 and this gear meshes with a plurality of planetary gears 68, the planetary gears meshing in turn with the inner teeth of a fixed ring gear 70. The planetary gears 68 are rotatably mounted by means of spindles 72 on a spider 74 that has an elongated hollow hub 75. This spider 74 constitutes one end of the rotary reel frame 36. In the construction shown, the hub 75 of the spider fixedly carries a suitable casting 76 having sockets 78 into which the ends of the two tubular rods 38 extend and are secured by cross pins 80. The spider 74 is journalled by suitable bearings 82 in the intermediate support structure 25.

The brake 46 may be of a well known type that is normally ineffective and may be electrically energized for braking action on the drive shaft 44. The electric brake 46 may, for example, be the Model 500 electric brake, manufactured by Warner Electric Brake and Clutch Company, in Beloit, Wisconsin. In the preferred practice of the invention, a centrifugal switch 84 is provided to energize the brake 46 automatically in response to a predetermined maximum speed of rotation of the reel 35. For this purpose, the drive shaft section 44c may be provided with a gear 85 that meshes with a gear 86, the gear 86 being operatively connected with the centrifugal switch 84. The centrifugal switch 84 may be, for example, the Model GH-2 speed-sensitive switch, manufactured by Synchro-Start Products, Inc. in Skokie, Illinois.

In the preferred practice of the invention, it is further contemplated that means will be provided to keep the pilot of the aircraft informed of the speed of rotation of the reel 35. For this purpose, a conventional tachometer generator 88 may be provided. The drive shaft gear 85 meshes with a gear 90 on the shaft 92 of the tachometer generator 88. In a well known manner, the tachometer generator 68 is electrically connected to a tachometer indicator on a control panel at a control station in the aircraft. Thus the wiring diagram in Figure 9 shows the tachometer generator 68 connected by a pair of wires 94 to a tachometer indicator 95.

The second end of the reel frame 36 comprises a spider in the form of a rotary gear case 96, the rotary gear case having a pair of sockets 98 in which the ends of the tubular rods 38 are secured by cross pins 100. This rotary gear case is mounted by a bearing 102 on a fixed tubular shaft 104, the fixed tubular shaft being in turn anchored in the forward support structure 24. As shown in Figure 3, the fixed tubular shaft 104 extends through a hub 105 of the support structure and is anchored against rotation by a pair of radial pins 106, the radial pins being confined by a bushing 108.

For the purpose of actuating the level wind shaft 48, the fixed tubular shaft 104 that journals the forward end of the reel frame 36 is formed with a fixed sun gear 110 and this sun gear is in mesh with a plurality of relatively large planetary gears 112 in the rotary gear case 96. Each of the relatively large planetary gears 112 is keyed to a corresponding shaft 114 in the rotary gear case 96 and a corresponding small gear 115 is keyed to the same shaft for rotation in unison therewith. The smaller gears 115 mesh with a relatively large central gear 116 on the level wind shaft 48. The level wind shaft 48 is journalled by suitable bearings 118 in a hub portion 120 of the rotary gear case 96, the bearings being secured by a suitable bushing 122. Thus rotation of the reel frame 36 acting through the described planetary gearing causes simultaneous rotation of the level wind shaft 48 at a substantially slower rate than the reel 35.

The reel 35 has a hollow cylindrical body 124 in which is mounted a pair of longitudinal tubes 125 which, respectively, surround the two tubular rods 38 of the rotary reel frame 36. The two longitudinal tubes 125 extend through and are secured by a longitudinally spaced pair of discs 126, the two discs being unitary with the cylindrical body 124 of the reel. Each of these discs 126 has a central aperture 128 to clear the level wind shaft 48.

Fixedly mounted inside each of the longitudinal tubes 125 is a pair of longitudinally spaced linear ball bushings 130 that embrace the corresponding hollow rod 38 in a freely slidable manner. A traveling nut 132 is mounted on a heavy diametrical bar 133, and this bar is mounted on one of the discs 126 by suitable screws 134. The traveling nut 132 engages the endless helical groove 50 of the level wind shaft 48 in a well known manner to reciprocate the reel 35 axially on the reel frame 36 in response to rotation of the level wind shaft.

As shown in Figure 4, the previously mentioned cowling 30 that is provided with the slot 32 for the cable 20 has a bracket 135 therein on which is journalled a suitable guide pulley 136 for the cable. The guide pulley 136 is keyed to a stub shaft 138 which is peripherally cut away to provide a flat face for actuating the operating arm 140 of a suitable counter switch 142. The purpose of the counter switch is to create pulses in a footage counting circuit, as will be explained.

*Pitch control system for the propeller*

Figure 5:
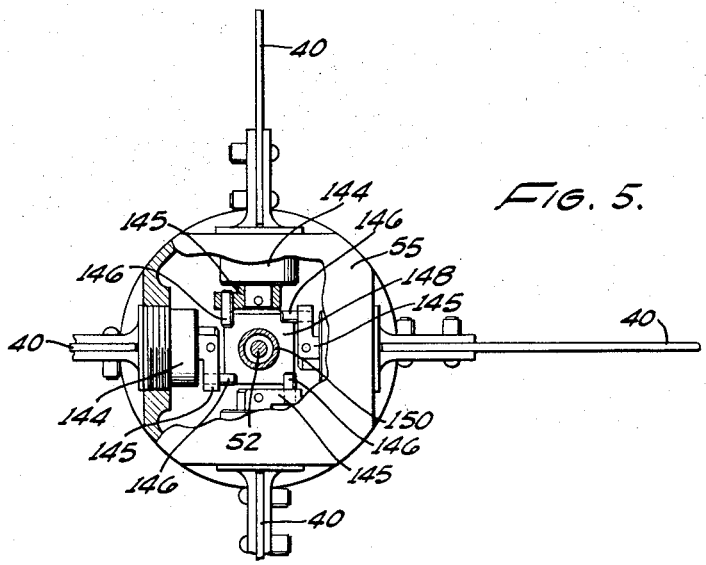
Figure 5 is a sectional view with parts broken away, the sectional view being taken along the line 5—5 of Figure 2 to show the pitch control mechanism of the propeller.

As shown in Figures 2 and 5, each of the four blades 40 of the propeller assembly is mounted in the hub structure 55 by suitable bearings contained in housing 144 and the inner end of each of these four propellers is provided with a crank 145 carrying a suitable crank pin 146. The four crank pins 146 slidingly extend into a slot 148 of a control member 150 so that changes in position of the control member 150 along the axis of rotation of the propeller assembly changes the pitch of all four propeller blades in a synchronous manner. The control member 150 is unitary with an axially movable sleeve 152 that is slidingly mounted in and keyed to a rearwardly extending cylindrical portion 154 of the hub structure 55 of the propeller assembly. Thus the control member 150 and the sleeve 152 rotate with the hub assembly of the propeller.

The operating rod 52 for controlling the pitch of the propeller blades 40 extends into the sleeve 152 and is operatively connected thereto by a ball bearing 155, the outer race of the ball bearing being fixedly connected to the sleeve and the inner race of the ball bearing being connected to the operating rod. Thus axial movement of the rotating sleeve 152 by the operating rod 52 rotates the various cranks 145 for synchronous pitch adjustment of the propeller blades 40, the blades being completely reversible in pitch in this manner.

As best shown in Figure 3, the previously mentioned fitting 54 on the forward end of the operating rod 52 of the pitch control mechanism is secured on the operating rod in a longitudinally adjustable manner by means of a cylindrical nut 156 that fits into an end bore 158 of the fitting. The fitting 54 is formed with a pair of parallel longitudinal slots 160 to permit the fitting to be operatively connected to an operating arm 162. As shown in Figure 7, the operating arm 162 has a pair of end portions 164 extending into the two slots 160 and each of these end portions is forked to straddle and thereby engage a corresponding pin 165 that intersects the slot. The operating arm 162 is keyed to the end of a countershaft 166 that is journalled in suitable spaced bearings 168. One of the bearings 168 is mounted in an ear 170 of a support bracket 172 and the other bearing is mounted in a wing 174 of the bracket. The support bracket 172 is mounted on the forward support structure 24 by cap screws 175.

The countershaft 166 may be controlled by a suitable remotely controlled actuator, generally designated 176, that is mounted on the bracket wing 174 by screws 178. The actuator 176 has a short actuating shaft 180 extending through the bracket wing 174. A gear segment 182 fixedly mounted on the actuating shaft 180 meshes with a second gear segment 184 that is fixedly mounted on the countershaft 166. Thus rotation of the actuating shaft 180 causes the operating arm 162 to swing about its axis with consequent longitudinal shift of the operating rod 52 that controls the pitch of the four propeller blades 40.

The remotely controlled actuator 176 comprises a suitable reversible motor 185 incorporating reduction gearing. Limit switches for the control system are provided in a housing 186 and a follow-up potentiometer 188 is unitary with this housing. What may be termed a positioner relay assembly 190 (Figure 6) is suitably mounted on the forward support structure 24.

*Wiring system*

While any suitable remote control system may be employed, the arrangement illustrated diagrammatically by Figure 9 is preferred. The principal parts of the remote control arrangement include: a manually operable pitch-control potentiometer 192 at the control station on the aircraft; the previously mentioned follow-up potentiometer 188; the previously mentioned reversible motor 185, the previously mentioned positioner relay assembly 190 represented by the broken line rectangle in Figure 9; and a master switch 195 that is located at the control station of the aircraft. The motor 185 is operatively connected to the movable contact of the follow-up potentiometer 188 as indicated by the dotted line 196.

The master switch 195 is connected to a suitable source of direct current and is connected by wires 198 and 200 to one end of each of the potentiometers 188 and 192, the second ends of each potentiometer being grounded. The positioner relay assembly 190 includes a polarized relay 202, the coil of which is in series with the movable contacts of the two potentiometers 188 and 192, and further includes a wire 204 connecting the relay coil with the potentiometer 188 and a wire 205 connecting the other end of the coil to the potentiometer 192. The polarized relay 202 has a normally open relay arm 206 to control a relay 208 for clockwise rotation of the motor 185 and has a second normally open relay arm 210 to control counterclockwise rotation of the motor. The relay 208 has a relay arm 214 that normally lies against a contact 215 and the relay 212 has a relay arm 216 that normally lies against a contact 218, these two relay arms 214 and 216 being electrically interconnected as shown.

When the relay 208 is energized by closing action of the relay arm 206 of the polarized relay 202, the following circuit is closed for clockwise rotation of the motor 185: wire 198 from the master switch 195, wire 200, wire 220, wire 222, contact 218, relay arm 216, relay arm 214, contact 224, wire 225, limit switch 226, and the clockwise field coil of the motor. When the relay 212 is energized by closing action of the relay arm 210 of the polarized relay 202, the following circuit is closed for opposite rotation of the motor 185: wire 198 from the master switch 195, wire 200, wire 220, wire 222, contact 215, relay arm 214, relay arm 216, contact 228, wire 230, limit switch 232 and the counterclockwise field coil of the motor.

It is apparent from the foregoing that as long as the pitch control potentiometer 192 and the follow-up potentiometer 188 are balanced, the motor 185 will be stationary. Whenever the movable contact of the pitch control potentiometer 192 is moved and thereby upsets this balance, the motor 185 is automatically energized to adjust the movable contact of the follow-up potentiometer 188 to restore the balance. Since the motor 185 is connected to the operating rod 52 as heretofore described, this arrangement provides for remote control of the operating rod by the movable contact of the pitch control potentiometer 192.

Figure 9 also shows a counter circuit for a footage meter 233 at the control station, which footage meter has an addition coil 234 and a subtraction coil 235. One side of the addition coil and one side of the subtraction coil are connected to the master switch 195 by wires 236, 238 and 240. The second side of the addition coil 234 is connected to a contact 242 and the second side of the subtraction coil 235 is connected to a contact 244, these two contacts being the alternate contacts of a selector switch 245 which may be termed a direction switch since it responds to changes in the direction of rotation of the pulley 136. The direction switch 245 is in series with the previously mentioned counter switch 142.

The electrically actuated brake 46 may be energized through a circuit which includes a wire 246, a normally open switch 248 and the previously mentioned wire 236 from the master switch 195. The switch 248 is at the control station in the aircraft.

In the preferred practice of the invention, the brake 46 may also be energized by the previously mentioned centrifugal switch 84. In the arrangement shown in the wiring diagram of Figure 9, one side of the centrifugal switch 84 is connected by a wire 250 to the previously mentioned wire 236 from the master switch 195. The other side of the centrifugal switch is connected by a wire 252 with the coil of a brake relay 254 and also with one contact 255 of the brake relay. The brake relay 254 has two normally open relay arms 256 and 258, the relay arm 256 cooperating with the contact 255. The second relay arm 258 cooperates with a second contact 260 that is connected to the previously mentioned wire 246 by a wire 262. Both of the relay arms 256 and 258 are connected to the previously mentioned wire 250.

When the rotation of the reel 35 reaches a predetermined maximum speed, the centrifugal switch 84 closes automatically to energize the brake relay 254. The closing of the relay arm 258 against the contact 260 completes a brake-energizing circuit that includes the master switch 195, wire 236, relay arm 258, wire 262, and wire 246 to one side of the electric brake, the second side of the brake being grounded. The closing of the relay arm 256 against the contact 255 completes a holding circuit for the brake relay through wire 252 that keeps the brake relay energized independently of the centrifugal switch 84 and the closing of the second relay arm 258 against the contact 260 completes a circuit for energizing the brake 46. The holding circuit to the brake relay may be broken by momentarily opening the master switch 195 which is in series with the holding circuit.

Operation

In preparation for a target flight, a tow target 18 is snubbed in the launcher 14 by winding the cable 20 on the reel 35 and holding the cable taut by using the locking pin 56 to immobilize the reel in the manner indicated in Figure 2. When the aircraft is ready to take off, the wiring system shown in Figure 9 is energized by closing the master switch 195 and then the switch 248 is closed to energize the brake 46. With the brake 46 immobilizing the reel and the propeller, the locking pin 56 is removed prior to take off.

When it is desired to launch the target 18, the blades of the propeller 40 are feathered, the switch 248 is opened to deenergize the brake 46 thereby to free the reel for rotation. With the reel free to rotate, the usual spring means of the launcher 14 ejects the target 18 into the airstream and the drag on the target causes the cable to rotate the reel in the unwinding direction. The tachometer indicator 95 at the control station on the aircraft reveals the speed of unwinding rotation of the reel and the speed of rotation induced by the drag of the target may be increased by giving the propeller blades 40 a pitch angle to assist the rotation, or the speed of rotation may be decreased by giving the propeller blades an opposite pitch.

In the event that the reel 35 approaches an excessive speed of rotation, the centrifugal switch 84 closes to energize the brake relay 254, whereupon the brake 46 is operated to bring the reel to a complete stop. The pitch control 192 at the control station is then manipulated to feather the propeller blades 40. When the propeller blades are completely feathered, the master switch 195 is opened momentarily to break the holding circuit of the brake relay 254 and then the pitch control 192 is manipulated gradually for progressive effect on the speed of rotation on the reel until the desired speed of rotation is attained. When the footage counter at the control station indicates that the desired amount of cable has been unwound, the switch 248 is closed to immobilize the reel and the propeller blades 40 are feathered.

To reel in the tow target at the end of a target run, the pitch of the propeller blades 40 is adjusted to rotate the reel 35 in the winding direction and the switch 248 is opened to release the brake 46. The tachometer indicator 95 then provides guidance for adjusting the pitch control 192 at the control station to cause the reel to wind in the cable at the desired rate. The rate at which the cable is wound is reduced by manipulation of the pitch control 192 as the target 18 approaches the launcher 14 and, finally, the switch 248 is closed to immobilize the reel and thereby hold the tow target snubbed in the launcher for flight back to the base of operations.

Our description in specific detail of the presently preferred embodiment of the invention will suggest various changes, substitutions and other departures from our disclosure that properly lie within the spirit an scope of the appended claims.

We claim:

1. A reel assembly for use on an aircraft to control a tow cable or the like, comprising: an elongated housing to be carried by the aircraft; a reel for said cable positioned in said housing with the axis of the reel longitudinally of the housing; a variable pitch propeller carried by said housing on the axis of the reel and operatively connected with the reel for actuation thereof; operating means extending through said reel longitudinally thereof to vary the pitch of said propeller; and remote control means connected to said operating means for controlling the pitch of the propeller from a remote control station on the aircraft.

2. A reel assembly for use on an aircraft to control a tow cable or the like, comprising: an elongated housing to be carried by the aircraft; a reel in said housing with its axis extending longitudinally of the housing, said reel having an axial passage therethrough; means supporting said reel with freedom for the reel to rotate on its axis and to reciprocate along its axis; a rotary screw member mounted in said passage on said axis, said screw member having an endless thread extending helically in both longitudinal directions of the member; a traveling nut carried by said reel in engagement with said endless thread to reciprocate the reel axially in response to rotation of said screw member; a propeller to derive power from the airstream; planetary gearing at one end of said reel operatively connected to said propeller for actuation of the reel; and planetary gearing at the other end of the reel operatively connecting said rotary screw member with the reel for actuation of the rotary screw member.

3. An apparatus for use on an aircraft to handle a tow cable, comprising: a reel to be wound with a cable; aerodynamic means operatively connected to the reel to deliver power thereto from the airstream in the course of flight of the aircraft; first remote control means operatively connected to said aerodynamic means for varying the power developed by said aerodynamic means whereby the power input to said reel may be varied;

means responsive to rotation of said reel for sensing the rate of rotation of said reel; brake means operatively associated with said reel; self locking means for actuating said brake means made operative by said sensing means whenever the rate of rotation of said reel reaches a predetermined magnitude for actuating and maintaining actuated said brake means to hold said reel against rotation, thereby to afford an opportunity for actuation of said first remote control means to decrease the power developed by said aerodynamic means and thus reduce the power input to said reel; and second remote control means for unlocking and rendering inoperative said brake actuating means to release said brake means thereby to release said reel for operation by said aerodynamic means.

4. An apparatus as set forth in claim 3 in which said brake means comprises an electrically actuated brake; and said brake actuating means includes a circuit to energize said brake, a self-locking relay in said circuit closed in response to energization of the circuit by said means responsive to rotation of said reel for sensing the rate of rotation of said reel; and in which said second remote control means comprises a switch in series with the coil of said relay.

5. An apparatus for use on an aircraft to handle a tow cable or the like, comprising: an elongated streamlined housing for attachment to the aircraft; a reel for said cable in said housing with its axis of rotation positioned longitudinally of the housing; a variable pitch propeller operatively connected to the reel to deliver power thereto from the airstream in the course of flight of the aircraft; a pitch control means at a control station on the aircraft; a follow-up actuator in said housing to vary the pitch of said propeller in response to operation of said pitch control means; means to indicate the speed of rotation of said reel at said control station; an electrically actuated brake for said reel in said housing; means including a first switch means at said control station for controlling the energization of said brake; a second switch means in said housing to energize said brake in response to rotation of said reel at a predetermined maximum speed; a holding circuit to close in response to closing of said second switch means to keep said second switch means energized thereby to keep said brake energized; and a master switch at said control station for breaking said holding circuit.

References Cited in the file of this patent

UNITED STATES PATENTS

| 2,464,073 | Cotton | Mar. 8, 1949 |
| 2,634,926 | Worlidge | Apr. 14, 1953 |
| 2,760,777 | Cotton | Aug. 28, 1956 |

FOREIGN PATENTS

| 162,694 | Great Britain | May 2, 1921 |
| 736,015 | Great Britain | Aug. 31, 1955 |